United States Patent [19]

Jamison

[11] Patent Number: 4,865,159

[45] Date of Patent: Sep. 12, 1989

[54] ACOUSTIC HORN AND ATTACHMENT DEVICE

[76] Inventor: Michael V. Jamison, P.O. Box 806, Spring, Tex. 77383-0806

[21] Appl. No.: 220,514

[22] Filed: Jul. 18, 1988

[51] Int. Cl.$^4$ ............................................. G10K 11/10
[52] U.S. Cl. ..................................... 181/179; 181/159; 181/177; 181/187; 181/194; 55/302
[58] Field of Search ............... 181/175, 177, 179, 187, 181/188, 190, 194, 159; 55/286, 292, 302

[56] References Cited

U.S. PATENT DOCUMENTS

| | | | |
|---|---|---|---|
| 2,692,913 | 10/1954 | Kaminori | 181/188 |
| 2,854,091 | 9/1958 | Roberts et al. | 55/286 |
| 2,962,120 | 11/1960 | Lagarias | 55/292 |
| 3,053,031 | 9/1962 | Vedder et al. | 55/292 |
| 3,118,748 | 1/1964 | Delfs | 55/292 |
| 3,158,455 | 11/1964 | Lincoln | 55/292 |
| 3,413,781 | 12/1968 | Abboud | 55/292 |
| 4,201,556 | 5/1980 | Olsson | 55/292 |
| 4,529,422 | 7/1985 | Phillips | 55/292 X |

Primary Examiner—B. R. Fuller
Attorney, Agent, or Firm—Bernard A. Reiter; Mark G. Bocchetti

[57] ABSTRACT

Disclosed is an acoustic horn to aid in bulk powdered material handling particularly from trucks and railroad cars. Such acoustic horn is comprised of an external cone having a driver affix thereto. There is also an inverted internal cone contained within the external cone. There is a cylindrical throat communicating with the acoustic wave driver which extends into the internal cone, the combination of the throat extending into the internal cone contained within the external cone creates a folded horn arrangement wherein a horn of relative shortened length can achieve the desired low fundamental frequencies needed for bulk powdered material handling.

Extending radially from the mouth of the external cone is a flange. Means are provided to detachably affix said flange from the flange on existing manways present on trucks and railroad cars.

9 Claims, 3 Drawing Sheets

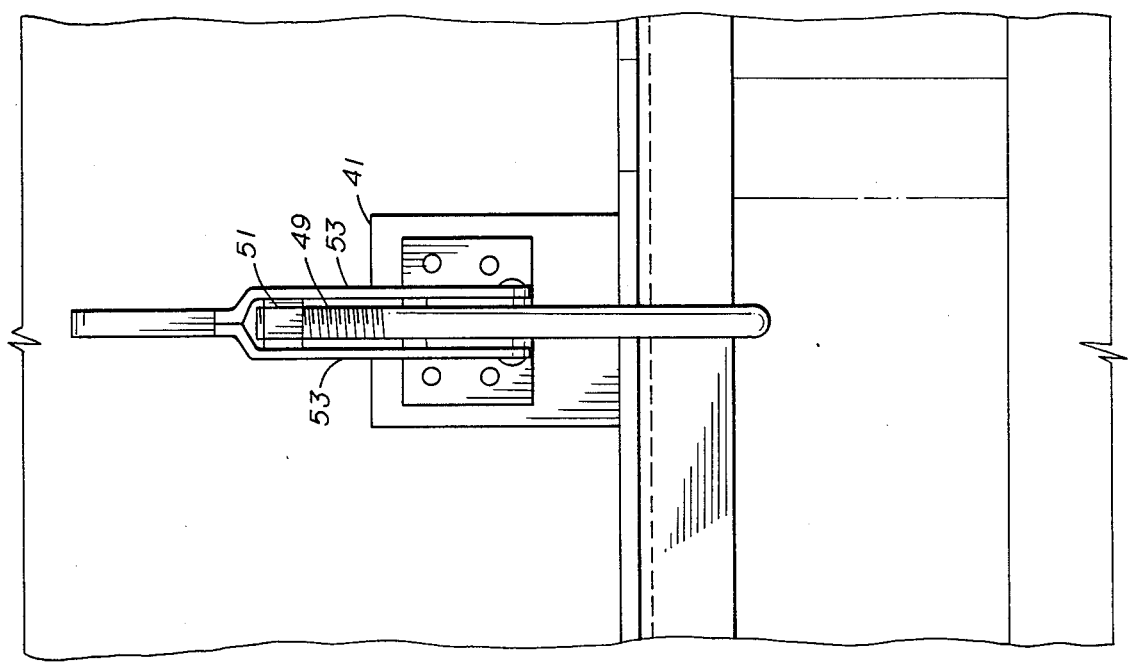
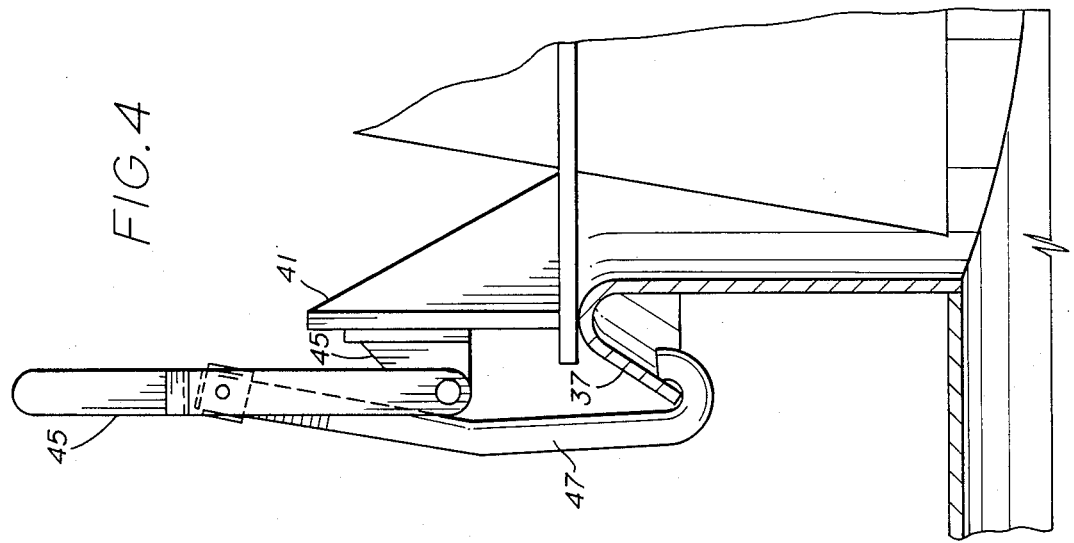

ACOUSTIC HORN AND ATTACHMENT DEVICE

BACKGROUND OF THE INVENTION

1. Field of the Invention

This invention relates generally to acoustic horns for material handling and, more particularly, the means for attaching acoustic horns to railroad cars for augmenting bulk material flow from railroad cars.

2. Brief Description of the Prior Art

Acoustic horns have been used for a variety of purposes related to material handling. Most commonly, sonic generators or loud speakers have been used to aid in cleaning filter media. Examples of this can be found in U.S. Pat. No. 2,962,120 to Lagarias, U.S. Pat. No. 3,118,748 to Delfs, U.S. Pat. No. 3,053,031 to Vedder, et al., U.S. Pat. No. 4,201,556 to Olsson and U.S. Pat. No. 2,854,091 to Roberts, et al. Sound generators have also been used to aid in gas/particulate separation as shown in U.S. Pat. No. 3,158,455 to Lincoln and U.S. Pat. No. 3,413,781 to Abboud.

The unloading of bins or hoppers containing bulk powdered materials such as flour, cement, gypsum, kaolin and graphite have problems associated therewith which also lend themselves to the use of acoustic horns. Quite often when unloading such bulk powdered material from trucks and rail cards, the unloading is interrupted when the material compacts or bridges near the unloading nozzle and the flow of the material from the truck or rail car ceases.

Another problem faced in unloading bulk powdered materials is funneling. In this situation, a conical airspace forms above the unloading nozzle and flow of the material is reduced or may cease completely. This is typically referred to as rat-holing.

Whether the problem is bridging or funneling, the common action taken by the operator would be to beat the side of the truck or rail car with a large hammer in order to shake the material loose. This method took an obvious toll on the trucks and rail cars. Further the unloading process is considerably delayed by having first to recognize that funneling or bridging has occurred and then, having to physically shake the material loose by beating the side of the car.

Mechanical vibrators have also been used to aid in the unloading of bulk powdered materials with some success. However, the use of mechanical vibrators may result in compaction of the material or size classification of the material resulting in the blockage becoming more severe. It is important to keep the bulk powdered material fluidized such that it will flow from the truck or rail car thus reducing manhours and the total unloading time. Further, it is preferable to have the ability to refluidize the powdered material once the flow stops without creating an undesirable side effect such as the damage to trucks and rail cars created by hitting them with hammers and the size classification of the material which can be caused by the use of mechanical vibrators.

SUMMARY OF THE INVENTION

It is therefore an object of the present invention to revive an acoustic horn for use in fluidizing bulk powdered materials being unloaded from trucks and rail cars.

It is a further object of the present invention to provide an acoustic horn which is easily mountable to and detachable from trucks and rail cars.

Yet another object of the present invention is to provide an acoustic horn for fluidizing bulk powdered materials contained within trucks and rail cars which requires no structural modifications to the trucks and rail cars.

Still a further object of the present invention is to provide an acoustic horn for fluidizing or compacting bulk powdered materials contained within trucks and rail cars which can be used to sequentially unload a series of trucks and rail cars utilizing a single acoustic horn.

Another object of the present invention is to provide an acoustic horn which can be mounted to trucks and rail cars to compact bulk powdered materials during loading into such trucks and rail cars.

Briefly stated, the foregoing and numerous other objects, features and advantages of the present invention are accomplished by designing an acoustic horn which can be installed on the hatch or manway of a rail car or truck. This is accomplished by providing the horn with a flange at that end of the horn opposite the horns driver which is mountable to and detachable from the flange of the truck or rail car hatch or man way. Such hatches or manways are typically 20" or 30" in diameter. In the case of those hatches which are provided with threaded hold down means, the flange of the acoustic horn is supplied with brackets extending therefrom which match up with the existing threaded hold downs such that the acoustic horn can be easily secured to the hatch flange.

With the 30" diameter round hatches, quite often the hatches are equipped with a 3/16" pressed steel covers which fit tightly over a rolled steel hatch ring to provide weather proof protection. To affix an acoustic horn of the present invention to such hatches, the flange of the acoustic horn is provided with brackets having threaded j-bolts extending therefrom or j-hook pull latches mounted thereto which reach under the lip of the rolled steel hatch ring. Thus, the acoustic horn can be attached to and removed from such round hatches merely by threading or unthreading three j-bolts or locking or unlocking three j-hook pull latches.

BRIEF DESCRIPTION OF THE DRAWINGS

FIG. 4 is a detailed side view of the J-hook pull latch alternative embodiment attachment means.

FIG. 5 is a detailed front view of the J-hook pull latch alternative embodiment attachment means.

DESCRIPTION OF THE PREFERRED EMBODIMENT

There are two primary considerations when fluidizing or densifying bulk powdered materials with acoustic horns. The first is the frequency. Frequencies of 125 Hz to 300 Hz have proven to be the optimum frequencies for sonic cleaning. Frequencies above 300 Hz are less effective in sonic cleaning. Further, such higher frequencies are audible and annoying to human hearing.

The second important consideration in fluidizing bulk powdered materials through the use of acoustic horns is the sound pressure level. The sound pressure level is usually measured in decibels. To be effective, the sound pressure level of the fundamental frequency should be above 130 decibels. The greater the sound pressure level, the more effective the cleaning. Thus, ideally, the acoustic horn used to fluidize bulk powdered solids should be capable of delivering low frequency sound waves at a high sound pressure level.

Acoustic horns produce a range of frequencies. The lowest frequency in the range of a particular acoustic horn is referred to as the fundamental frequency. It is the fundamental frequency measured in Hz which is used to rate acoustic horns.

Lower frequencies carry longer wave lengths than higher frequencies and thus have a greater impact on the surfaces in which they come in contact. As a result, given two horns which can produce an identical sound pressure level of 135 db, but having fundamental frequencies of 120 Hz and 300 Hz, the lower frequency acoustic horn will generate a greater acoustic energy with which to vibrate the bulk powdered materials.

Figure 1:
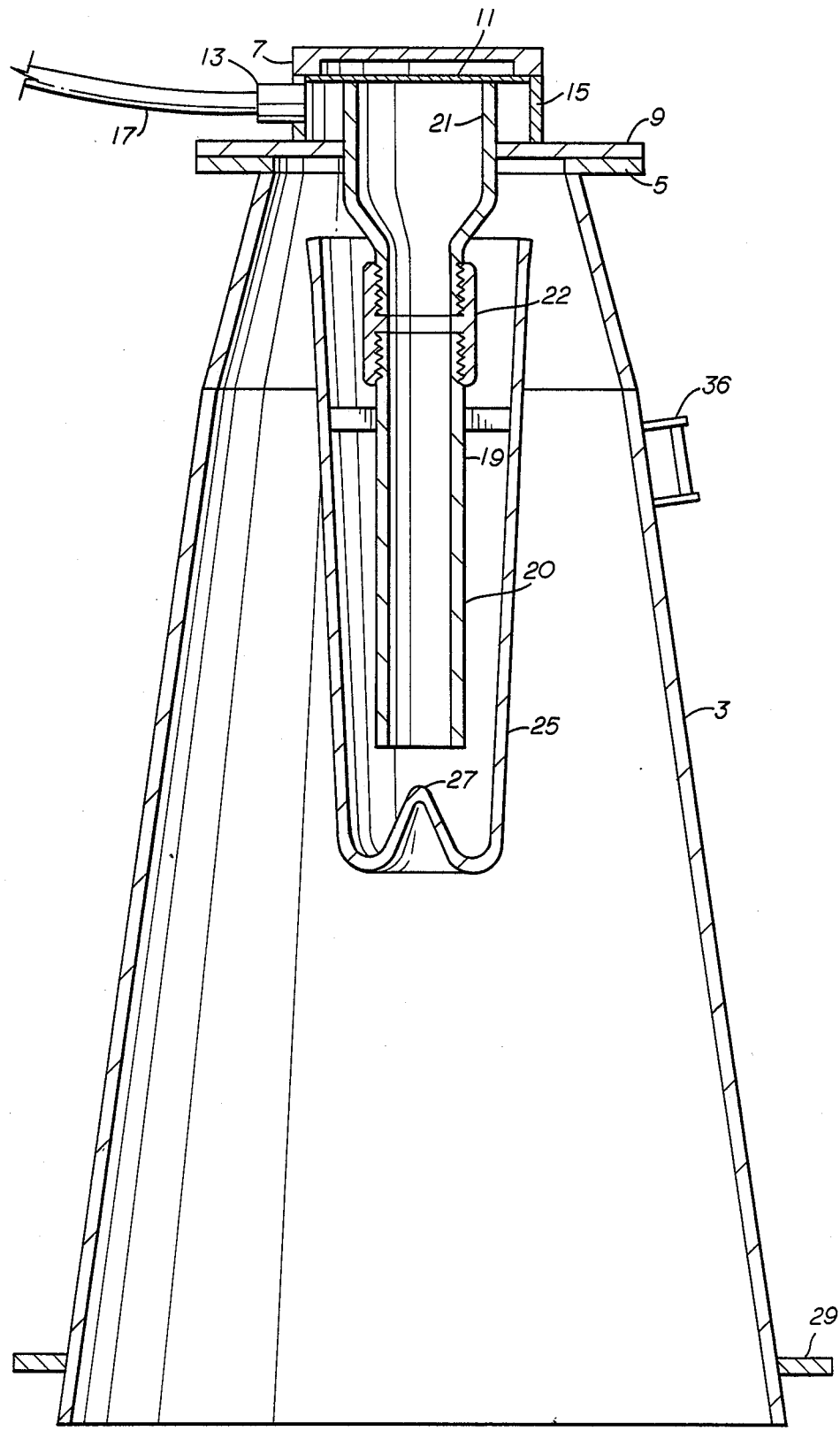
FIG. 1 is a cross-sectional view of the acoustic horn of the present invention.

Referring to FIG. 1, there is shown an acoustic horn 1 having an external cone or bell 3. At the narrow end of external cone 3 there is a flange 5. There is an acoustic wave generator or sound driver 7 having a flange 9 attached thereto. Flanges 5 and 9 may be bolted together thereby affixing driver 7 to external cone 3. Contained within driver 7 is a diaphragm 11. A nozzle 13 is provided in the side wall 15 of driver 7. Compressed air is supplied to driver 7 through nozzle 13 via hose 17. The compressed air serves to vibrate diaphragm 11 thus generating acoustic waves. Compressed air is preferably supplied in the range of 50 to 90 psig.

Mounted to flange 5 is throat or conduit 19. Throat 19 includes a threaded reducer or belled end 21 of larger diameter which extends upward toward diaphragm 11. Throat 19 also includes a lower cylindrical portion 20 which extends downward into external cone 3. Belled end 21 is connected to lower cylindrical portion by means of threaded coupling 22, these three components comprising throat 19. Throat 19 is provided with brackets 23 which extends radially outward from throat 19 to support internal cone or bell 25 which substantially surrounds that portion of throat 19 below the bell end 21. Located within internal cone 25 and attached thereto is deflector cone 27. In operation, compressed air is delivered to driver 7 via hose 17. Acoustic waves are generated by diaphragm 11. Such acoustic waves travel down through throat 19 and are deflected by deflector cone 23 to travel upward within internal cone 25 but outside of throat 19. As the acoustic waves exit internal cone 25, they reflect off of flange 5 and travel down through external cone 3.

At the wide end of external cone 3, there is provided flange 29 extending radially therefrom. Flange 29 has a series of brackets 31 mounted thereto. Brackets 31 are spaced at intervals of 120° about the circumference of flange 29.

There is a hatch or manway 33 located on the truck or rail car. This hatch or manway typically has an inside diameter of 20″ but in some cases the inside diameter may be 30″. For the 20″ diameter hatches 33 the existing covers 33 of such hatches have brackets extending therefrom substantially identical to the brackets 31 attached to flange 29. There are existing threaded holddowns 35 which are used to affix the existing hatch cover to hatch 33. Once the hatch cover is removed, the existing threaded hold-downs 35 can be used in conjunction with brackets 31 to attach acoustic horn to hatch 33.

Affixed to external cone 3 is handle 36. Because the acoustic horn of the present invention is relatively compact and is preferably manufactured from aluminum, it is capable of being handled, installed and removed by a single operator. Handle 36 aids the operator in manipulating the acoustic horn.

It has been determined that the attachment of an acoustic horn to a truck or rail car not only aids in unloading operations, but is also beneficial to loading of bulk powdered materials into trucks and rail cars. Specifically, operating an acoustic horn during loading serves to densify or compact the bulk powdered material, thus allowing each truck or rail car to carry additional material. In field tests of loading kaolin, up to 15% more material is loaded into each car.

Figure 2:
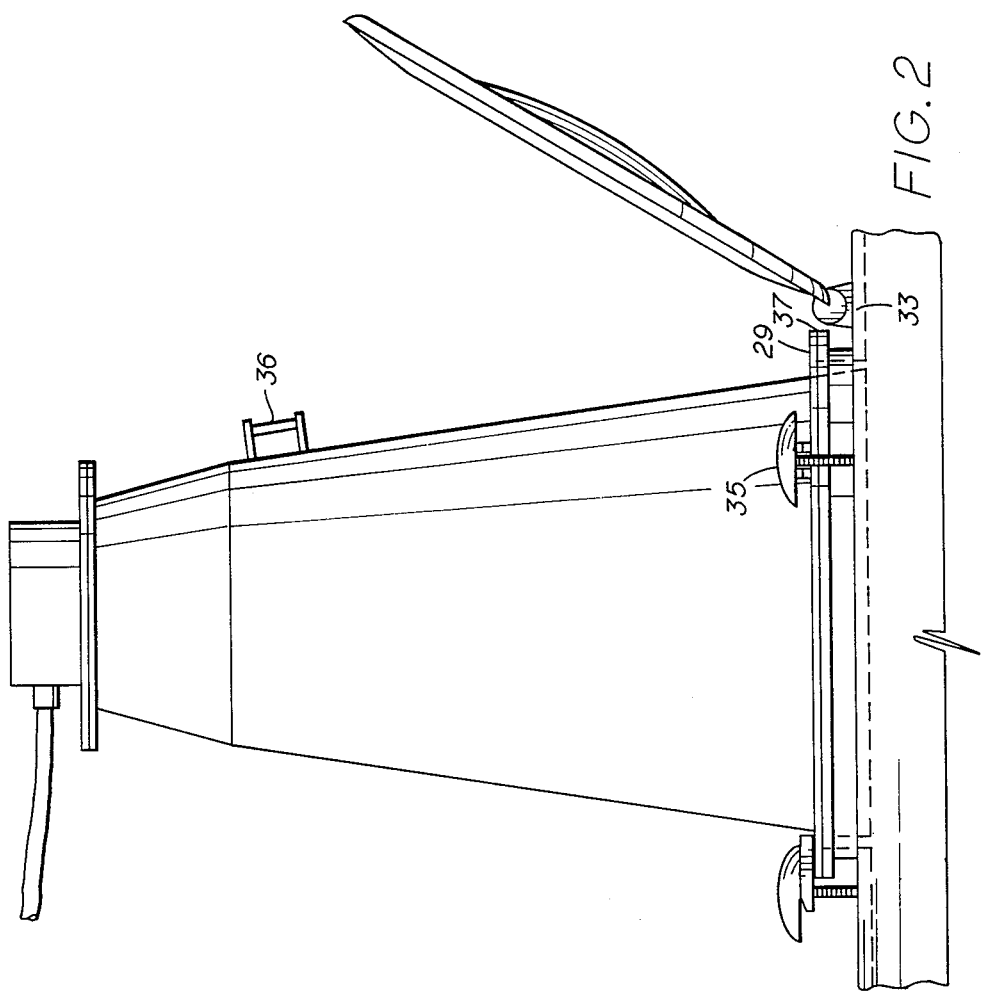
FIG. 2 is a side elevation of the acoustic horn of the present invention.

FIG. 2 shows an alternative embodiment for attaching the acoustic horn to hatch ways of 30″ inside diameter. Of course, the flange 29 will have to have a diameter substantially equivalent to the outside diameter of the rail car flange 37. Rail car flange 37 is typically a rolled flange thus creating an annular recess 39. Mounted to flange 29 are gusseted brackets 41. Attached to gusseted brackets 41 is latch support 43. Pivotally connected to latch support 43 is the proximal end of lever 45. Pivotally connected to lever 45 at a point approximately midway between the proximal and distal ends of lever 45 is j-hook 47 having a threaded end 49. Threaded end 49 threadably engages with nut 51 secured between arms 53 of lever 45. Operating lever 45 will enable the operator to engage or disengage j-type hook 47 to and from rail car flange 37 thus enabling the operator to easily and rapidly dismount the mount acoustic horn 1 to rail car flange 37 and further, to allow the operator to rapidly dismount the acoustic horn 1 from rail car flange 37.

Figure 3:
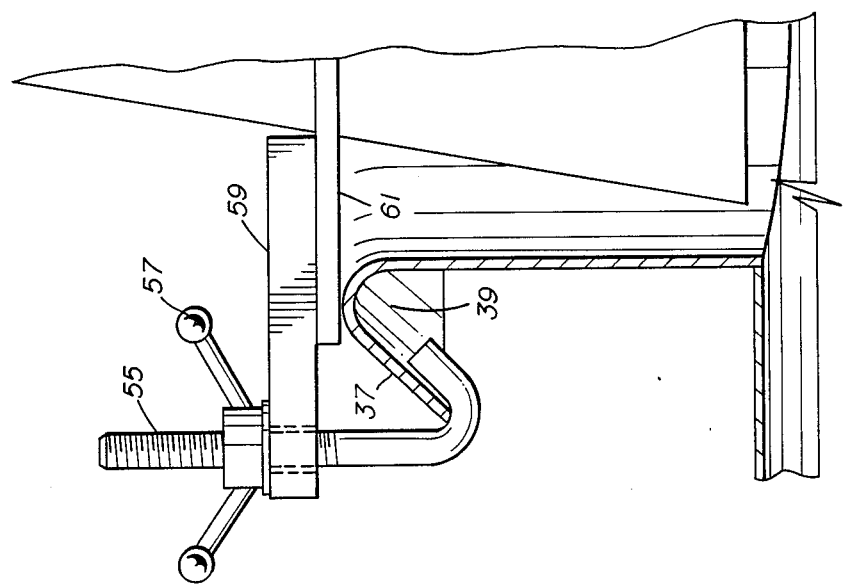
FIG. 3 is a detailed drawing of the J-bolt alternative embodiment attachment means.

In an alternative embodiment, the levered j-type pull latches depicted in FIGS. 4 and 5 can be replaced by the threaded j-bolts 55 shown in FIG. 3. Threaded j-bolts 55 would engage with the rail car flanges in a manner identical to the j-type latches. Such j-bolts would threadedably engage with wing nuts 57. In such alternative embodiment, there would be brackets 59 radially extending from flange 61 much in the same manner that brackets 31 extend from flange 29 in FIG. 1. Thus, affixing an acoustic horn 1 to a rail car flange would be simply a matter of positioning j-bolts 55 and tightening wing nuts 57.

The acoustic horn 1 shown in FIGS. 1 and 2 includes an external cone having an inside diameter of approximately 19″ at its widest point. The 19″ inside diameter is an important consideration when it is considered that the horn is designed to fit within a standard 20″ diameter rail car access hatch. Further, it is desirable to have as large as a diameter horn mouth as possible, because, generally speaking, larger the horn mouth, the lower the frequency of sound that can be produced by the horn. A horn having a mouth diameter of 19″ can produce acoustic waves having a frequency of below 200 Hz. However, for a horn of 19″ diameter to produce a sound wave of below 200 Hz, the length of the horn would have to be over 42″. A horn of that length would be some what cumbersome and difficult to handle and mount by the operators. For that reason, the horn of the present invention has an external cone 3 and an internal cone 25 which act in series with one another thus creating a folded horn arrangement. The cumulative length of external 3 and internal cone 25 is greater than 42″ thus enabling the horn to produce the desired low fundamental frequency while at the same time being relatively short in over all length and easy to handle by a single operator.

It should be recognized that providing a flanged acoustic horn provides other significant benefits. Because the horn is affixed to and completely covers the manway, loading and unloading can be accomplished in rainy weather. This could not be easily done where the bulk powdered material had to be manually fluidized through an open manway which allow the material to get wet. The flange arrangement also allows fluidization when the material is being conveyed under positive pressure.

From the foregoing, it will be seen that this invention is one well adapted to obtain all of the ends and objects hereinabove set forth, together with other advantages which are obvious and which are inherent to the device.

It is to be understood that certain features and subcombinations are of utility and may be employed with reference to other features and subcombinations. This is contemplated by and is within the scope of the claims.

As many possible embodiments may be made of the invention without departing of the scope thereof, it is to be understood that all matter herein set forth or shown in the accompanying drawings is to be interpreted as illustrative and not in a limiting sense.

What is claimed is:

1. An acoustic horn for use in bulk powdered material handling from trucks and railroad cars comprising:
   (a) an acoustic wave generator:
   (b) a cone affixed to said acoustic wave generator;
   (c) a flange extending radially from said cone;
   (d) a plurality of brackets extending radially from said flange;
   (e) a hatch located in the truck or railroad car; and
   (f) threaded hold-downs for maintaining a cover over said hatch, said brackets being aligned with said hold-downs so that said threaded hold-downs can be engaged with said brackets to retain said acoustic horn over said hatch.

2. An acoustic horn for mounting to manways on trucks and railroad cars comprising:
   (a) an acoustic wave generator;
   (b) a cone affixed to said acoustic wave generator;
   (c) a plurality of brackets extending radially from said cone;
   (d) threaded hold-downs for retaining a cover on said manways, said brackets being aligned with said threaded hold-downs so that said threaded hold-downs can be engaged with said brackets to retain said acoustic horn over said manway.

3. An acoustic horn for mounting to manways on trucks and railroad cars to aid in bulk powdered material handling comprising:
   (a) an acoustic wave generator;
   (b) a cone affixed to said acoustic wave generator;
   (c) a first flange extending radially from said cone;
   (d) a second flange extending radially from said manway;
   (e) means for attaching said first flange extending radially from said cone to said second flange extending radially from said manway.

4. An acoustic horn for mounting to manways on trucks and railroad cars to aid in bulk powdered material handling as recited in claim 3 wherein said means for attaching is comprised of:
   (a) a plurality of brackets affixed to said first flange;
   (b) a lever pivotally attached to each of said brackets;
   (c) a j-hook pivotally attached to said lever, said j-hook engaging said second flange by operation of said lever to mount said acoustic horn to said manway.

5. An acoustic horn for mounting to manways on trucks and railroad cars to aid in bulk powdered material handling as recited in claim 3 wherein said means for attaching is comprised of:
   (a) a threaded j-bolt extending from each of said brackets;
   (b) nut means for supporting said j-bolts from said brackets, said j-bolts engaging said second flange when said nut means are tightened.

6. An acoustic sound wave generator for mounting to manways on trucks and railroad cars comprising:
   (a) an external cone having an open mouth;
   (b) an acoustic wave driver attached to said external cone;
   (c) an internal cone contained within said external cone;
   (d) a substantially cylindrical throat extending from said acoustic wave drive into said internal cone;
   (e) a first flange extending radially from said external cone proximate to said open mouth;
   (f) a second flange extending radially from said manway;
   (g) means for attaching said first flange extending radially from said external cone to said second flange extending radially from said manway.

7. An acoustic sound wave generator for mounting to manways on trucks and railroad cars as recited in claim 6 wherein said means for attaching is comprised of:
   (a) a plurality of brackets affixed to said first flange;
   (b) a lever pivotally attached to each of said brackets;
   (c) a j-hook pivotally attached to said lever, said j-hook engaging said second flange by operation of said lever when it is desired to mount said acoustic horn to said manway.

8. An acoustic sound wave generator for mounting to manways on trucks and railroad cars as recited in claim 6 wherein said means for attaching is comprised of:
   (a) a threaded j-bolt extending from each of said brackets;
   (c) nut means for supporting said j-bolts from said brackets, said j-bolts engaging said second flange when said nut means are tightened.

9. An acoustic horn for mounting to manways on trucks and railroad cars, the manways having threaded hold-downs for maintaining a blind flange over the manways, said acoustic horn comprising:
   (a) an acoustic driver;
   (b) a cone fixed to said acoustic driver;
   (c) a flange extending substantially radially from said cone;
   (d) a plurality of brackets affixed to said flange, said brackets configured to align with· the threaded hold-downs so that the threaded hold-downs can be engaged with said brackets to retain said acoustic horn over the manway.

* * * * *